United States Patent [19]

Doncer et al.

[11] 3,951,795
[45] Apr. 20, 1976

[54] PROCESS AND APPARATUS FOR TREATING FATTY WASTE WATER

[75] Inventors: Alex J. Doncer, Burbank; Harold R. White, New Lenox, both of Ill.

[73] Assignee: Alar Engineering Corporation, Chicago, Ill.

[22] Filed: Apr. 16, 1975

[21] Appl. No.: 568,559

[52] U.S. Cl. .................................. 210/61; 210/73 S; 210/84; 210/96 R; 210/201; 210/208
[51] Int. Cl.² .................... B01D 37/00; B01D 21/01
[58] Field of Search .................. 210/59, 61, 69, 83, 210/84, 96, 97, 208, 201, 73, 75

[56] References Cited
UNITED STATES PATENTS

| | | | |
|---|---|---|---|
| 2,692,184 | 10/1954 | Cabot et al. | 210/69 X |
| 3,664,951 | 5/1972 | Armstrong | 210/96 X |
| 3,725,258 | 4/1973 | Spector et al. | 210/96 X |
| 3,743,598 | 7/1973 | Field | 210/96 X |

Primary Examiner—John Adee
Attorney, Agent, or Firm—Hill, Gross, Simpson, Van Santen, Steadman, Chiara & Simpson

[57] ABSTRACT

A system for cleanup of waste waters of the type characteristically produced in food-processing operations. Such waste waters typically contain significant amounts of fat and grease materials of animal and plant origin together with other contaminants. Such a starting waste water is charged to the system at a non-uniform rate as generated and is continuously first chemically treated in two successive zones, then is passed into a quiescent holding zone wherein settling can occur and wherein variations in waste water input volume or output volume can be smoothed out. Fluid from the bottom regions of such holding zone is continuously charged at a uniform rate to an operating rotary vacuum filter assembly to accomplish separation of solids. The product water is highly purified.

14 Claims, 3 Drawing Figures

PROCESS AND APPARATUS FOR TREATING FATTY WASTE WATER

BACKGROUND OF THE INVENTION

The water pollution problem in the food-processing industry (including particularly meat-packing houses, slaughtering houses, meat canning, and the like meat processing operations) is becoming more and more serious as new regulations are being imposed and existing regulations strictly enforced. Present regulations impose a "surcharge" on BOD and suspended solids and limit oils and grease to 100 ppm. Proposed regulations under the federal NPDES (National Pollutant Discharge Elimination System) program will put limits on BOD, suspended solids, and oils and grease which are substantially lower than present standards. The cleanup of equipment used in this industry generates waste waters which characteristically contain significant amounts of fats and greases (mainly, mixed triglycerides) of animal or plant origin, sometimes termed hexane solubles, as well as miscellaneous contaminants, such as cleaning agents, surfactants, alkalies, acidic materials, and the like. Such waste waters contain both suspended and dissolved solids and tend to be quite stable, and such waters characteristically contain levels and impurities far above those permitted under present federal and state pollution standards. Thus, such waste waters must be treated to clean them up sufficiently for discharge into sewers of conventional sanitation systems.

The task of clarifying and purifying such waste waters, at least to an extent sufficient to produce a product water which meets the minimum standards for sewering, constitutes a major problem particularly when such task is to be accomplished in an economical practical and reliable manner. Heretofore, the art has commonly attempted to effectuate a separation of water from animal derived fatty materials using gravity separation devices which are dependent upon differences in the specific gravity of water relative to animal fats and greases in admixture therewith. Thus, it is contemporarily common to find in conjunction with food-processing operation, a so-called grease pit into which waste waters from such operation are discharged. Such a grease pit as often as once a day may be cleaned manually by skimming to remove floating solids. Waters passing through the grease pit are simply routinely sewered. Available evidence indicates, however, that during cleanup periods such a grease pit cleanup water can commonly contain more materials (usually in an emulsified form) than was present in the initial input waste water, and such emulsified materials may be more stable than the initial fatty waste water. Simple gravity separation is inadequate to meet conventional effluent requirements.

Perhaps the most prevalent system currently on the market is Dissolved Air Flotation. This system can meet the effluent quality requirements, however large qualities of sludge are produced which need additional treatment to avoid exorbitant waste disposal costs. These systems also require chemical pretreatment, surge tanks, pumps, controls, and large amounts of space which result in an expensive and complicated operation.

A pollution control system designed for this industry must consider all of the following factors:

1. The waste stream from the plant will vary in flow rates, temperature, pH and composition.
2. The effluent from the treatment system should meet the present MSD criteria and the proposed 1977 Federal guidelines.
3. The sludge from the system should be relatively dry and free of excess water to reduce operating costs, eliminate additional treatment, and facilitate handling.
4. The unit should be fully automatic to reduce labor and minimize operational errors.
5. The unit should be compact and suitable for outdoor installation as space is at a premium.
6. The initial cost, installation cost and operating costs must be reasonable.

Prior to the present invention, no single prior art unit or system could meet all of the above considerations.

While various systems for animal fat and grease removal from water have been postulated, such systems typically suffer from a number of disadvantages, such as high initial cost and operational costs, complicated equipment and process sequences, excessive sensitivity to variations in composition of starting waste water, excessive space requirements, and the like. There is a great need in the art for a compact, reliable, relatively simple, relatively low cost system suitable for handling treatments of waste waters from food-processing operations.

BRIEF SUMMARY OF THE INVENTION

The present invention relates to a system for treatment of fat containing waste waters produced during normal industrial and commercial scale food-processing operations, including equipment cleanup of processing operations, which meets all of the above requirements. The system of the present invention requires no modifications to present plant operations and procedures. For example, an existing grease pit may be divided into compartments and used for the chemical treatment. An underground concrete settling chamber may be constructed alongside the grease pit to receive the treated waste. The oils and greases settle rapidly to the bottom of this chamber as a sludge after the chemical treatment. During normal operation, the sludge and all of the liquid is pumped to a rotary vacuum filtration system. When periods of high surge loads occur, the settling chamber acts as a clarifier and the clear, purified effluent is allowed to overflow directly to the sewer. This effluent, while containing trace amounts of suspended solids, easily meets rigid governmental requirements.

The waste water cleanup system of this invention may be housed in an integral building structure and placed on top of a grease pit and settling basin, minimizing space requirements and installation costs. The chemical addition system, controls and other components of the system may also be housed in this structure. After filtration, the dry sludge is conveniently conveyed outside the structure into commercial dry waste disposal containers. Less than 1 cubic yard of sludge is typically produced per day as compared to 1200 gallons of sludge by air flotation. By the present invention, such a waste water is first mixed with a ferric salt aqueous solution until a pH in the range from about 3 to 5 is achieved. Thereafter, the resulting mixture is mixed with calcium hydroxide until a pH in the range from about 7 to 8 is achieved. After calcium hydroxide treatment, the resulting so-chemically treated waste waters are maintained in a hold zone which serves multiple functions. Finally, the so-chemically treated system is subjected to filtration using a rotary vacuum filter. The product filtered water is characteristically at least sufficiently high in its quality to meet all known governmental standards for water-sewering purposes.

One advantage of the system of the present invention is that it can incorporate conventional grease pits of the type heretofore used in the meat-processing industry, though it is usually preferable to modify such prior art grease pits so that such can be used to best effectiveness as an element or elements in a system of the present invention.

Another advantage of the present invention is that it can provide a waste water treatment system which is highly compact and requires only a minimum of space; for example, the space above ground immediately over a grease pit modified for use in such a system is usually entirely sufficient for the entire waste water treatment system (besides the modified pit).

Another advantage of the present invention is that it provides a waste water treatment system which is readily adapted for automation so that a system of this invention can be automatically operated with a minimum of personnel involvement.

An aim of the present invention is to provide a waste water treatment system which is suitable for use with waste waters containing fats and greases of animal and/or vegetable origin, and which can be operated in an economical, practical, and reliable manner.

Another aim of the present invention is to provide a fatty waste water treatment system of the class indicated above which is both substantially completely insensitive to variations per unit of time in quantities of input waste waters being fed thereto and also substantially insensitive to relative quantities of contaminants present in incoming waste waters.

An object of this invention is to provide a waste water treatment system of the class just indicated above which is adapted to produce an aqueous effluent which complies with all known present and reasonably foreseeable future federal and state water pollution laws and regulations.

Another object of this invention is to produce a highly purified, preferably colorless product water from a starting waste water containing significant quantities of hexane solubles (including animal and vegetable derived fats and greases) which product water is adapted for direct sewer discharge to conventional sewage treatment plants.

Another object of this invention is to produce a system in which solid wastes are produced from waste waters containing significant amounts of hexane solubles (including animal and vegetable derived fats and greases), such solid wastes being generated in a substantially dry form which is adapted for easy removal and disposition, such as for sanitary landfill, thereby making possible the elimination of special auxiliary disposal services.

Another object of this invention is to provide an apparatus which is adapted to be manufactured in quantity and which is mounted in a unitized manner on skids or the like with piping and wiring generally preassembled in so far as practical for easy installation at any given pre-chosen location, preferably over a modified grease pit associated with a meat-processing operation or the like.

Another object of this invention is to provide a fatty waste water treatment system which is low in cost both from a capital investment and from an operational standpoint.

Another object of this invention is to provide a fatty waste water treatment system which employs inexpensive and known chemical treating agents in combination with filtration.

Another object of this invention is to provide a fatty waste water cleanup system which avoids the problems of using an air flotation procedure.

Another object of this invention is to provide a fatty waste water treatment system which utilizes a rotary vacuum filter assembly and which is adapted to be operated continuously for extended periods of time in an automatic manner with a minimum of servicing or maintenance.

Another object of this invention is to provide a fatty waste water treatment system which employs gravity as a means for effectuating a transfer of waste water being treated from one treatment zone to another in at least two zones.

Another object of this invention is to provide a fatty waste water treatment system which is adapted to be operated continuously, which accepts waste waters at a variable rate, preferably as generated, over an extremely wide rate range from 0 to some high (such as 400 gal/min.) value, and which generally ouputs at a typically uniform rate a continuous stream of clarified, purified water suitable for sewering.

Another object of this invention is to provide a fatty waste water treatment system which is adapted to operate in such a way that, even if the normal filtration provided by the system fails, there is produced a clarified water which meets minimum standards for sewering.

Other and further objects, purposes and advantages, aims, utilities and features will be apparent to those skilled in the art from a reading of the present specification and drawings.

DETAILED DESCRIPTION

Figure 1:
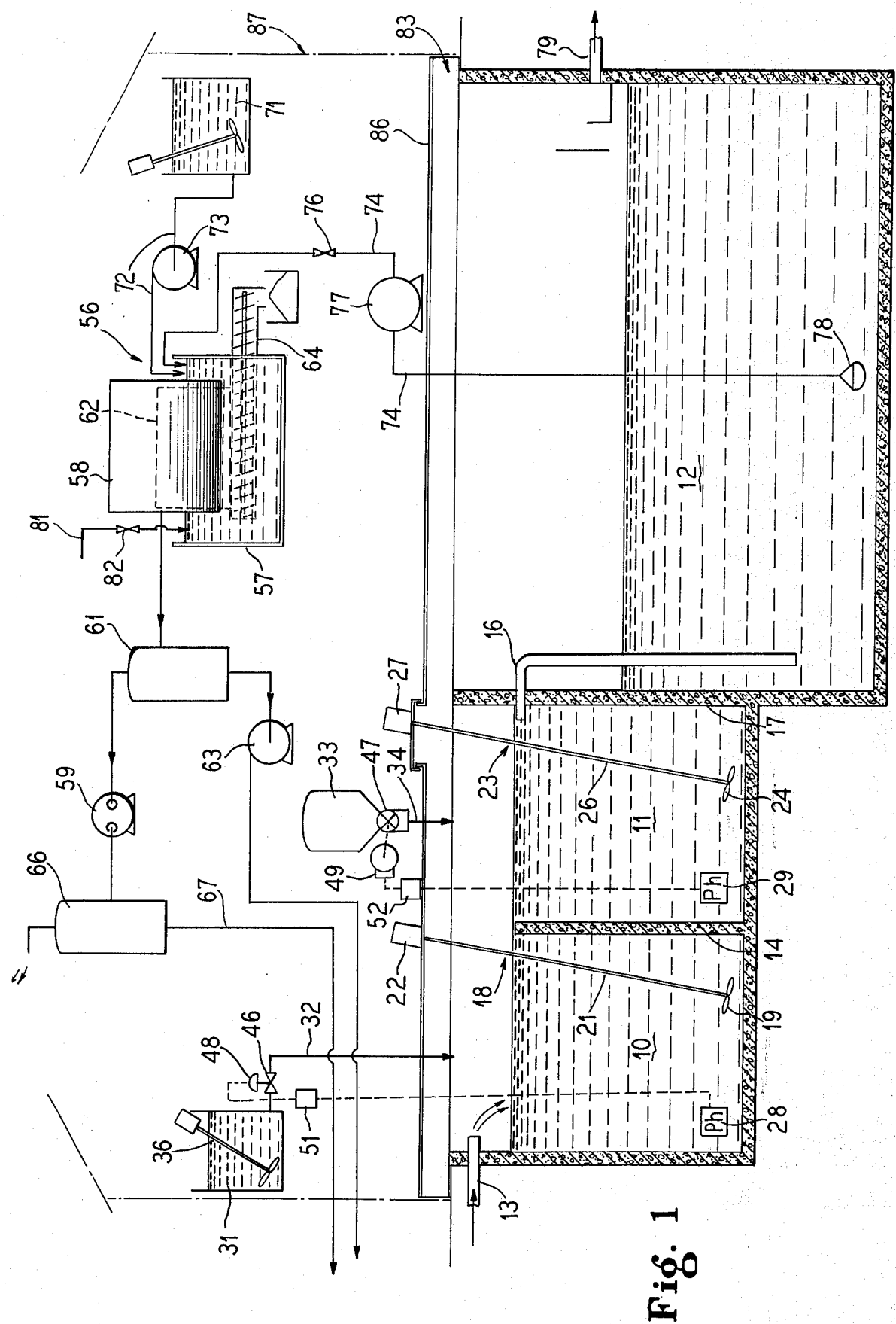
FIG. 1 is a flow diagram illustrating one preferred manner in which the process of this invention may be practiced.

In one aspect, the present invention is directed to a process for cleanup of fat-containing waste water whether of animal or vegetable origin. Such fat-containing waste waters are commonly and characteristically derived from cleanup of meat and food preparation operations and also from other miscellaneous sources and operations in and around meat and food preparation functions. Such a starting waste water composition typically contains from about 400 to about 4,000 parts per million by weight of hexane soluble material, although smaller and larger quantities of such materials may be present in any given such composition. For purposes of the present invention, the exact quantity of hexane solubles present in any given starting waste water is not important since a system of the present invention is not sensitive to the quantity of hexane solubles present over extremely wide ranges as those skilled in the art will appreciate from the teachings of the present specification and accompanying drawings.

For purposes of the present invention, the procedure employed for determining hexane soluble materials is provided in the Thirteenth Edition of Standard Methods of Treating Water and Waste Water, published by The American Health Association.

Because the exact chemical nature of the fats and greases present in a starting waste water composition can vary over extremely wide ranges, it is convenient for purposes of the present invention to characterize the fat, grease or oil content of a starting waste water of the type involved in the present invention in terms of the quantity of hexane soluble material present, as those familiar with the art will readily understand. Chemically, however, the fats, oils and greases present in a starting waste water being treated by the process and apparatus of this invention are of animal or vegetable origin and are triglycerides or possibly, derivatives thereof. Minor amounts of mineral hydrocarbons (alkanes, alkenes and saturated and unsaturated alephates and aromatic hydrocarbons as such) may be present, of course, without adverse effect upon system operability in a starting waste water composition.

Such a starting waste water composition typically contains from about 100 to 10,000 parts per million of suspended solids which are below about 200 millimicrons in average diameter although smaller and larger quantities of such solids may be present in any given such composition. Also, such a waste water composition has a pH typically in the range from about 5 through 14.

In addition, bulk quantities of such a starting waste water composition typically contain varying amounts of surfactants and cleaning agents which are used periodically in the cleanup of equipment and material used in meat and food processing operations. The chemical identification and relative quantities of individual such agents present in a particular starting waste water composition, as those skilled in the art will readily appreciate, can vary widely depending upon individual application considerations, operating conditions, choice of user and similar indefinite factors, so that it is not possible to completely characterize in a quantitative or qualitative manner such agents. It is, however, one of the distinct features of the present invention that a system of the present invention can be used for cleanup of starting waste water compositions containing hexane soluble materials of animal and vegetable origin regardless of the type and quantity of other materials which may be present in a starting waste water composition.

The temperature of a starting waste water composition charged to the system of the present invention can vary widely over ranges extending from ambient temperatures (e.g. about 20°C) up to about 70°C (although higher and lower temperatures may occasionally be encountered). Such a starting waste water composition is typically generated at an irregular rate, as those skilled in the art will appreciate, typical illustrative instantaneous rates typically ranging from and including 0 to values higher than about 400 gallons per minute, the exact value at any given instant depending upon a number of indefinite variables, such as plant size, type of cleanup operation involved, number of cleanup operations being conducted simultaneously, etc. It is an important feature of the present invention that starting waste water compositions are charged as generated into a system of the present invention without any need whatsoever for flow regulation or a preliminary hold tank or the like.

Thus, in accordance with the present invention in practice, a starting waste water composition is characteristically charged generally at an irregular rate to a first treating zone of a system of this invention. In such a first treating zone, there is mixed with such a starting waste water composition a sufficient quantity of a dissolved inorganic aqueous ferric salt solution to make the pH of the resulting mixture fall in the range of from about 3 to 5. Suitable ferric salts are simple inorganic materials; the exact chemical type is not critical. Presently preferred examples are ferric sulfate and ferric chloride. Iron sulfates are generally preferred over iron halides since the iron halides appear to be more corrosive of the equipment than are the iron sulfates. Furthermore, ferric chloride appears to be more hygroscopic than ferric sulfate, making shipment thereof somewhat inconvenient.

A starting solution of such a ferric salt typically comprises a concentration of ferric ions which ranges from about 10 weight percent (total weight basis) of such ferric salt up to the saturation point in water of the particular iron-salt employed (though lower starting concentrations may be employed). Conveniently and preferably, an aqueous solution of from about 10 to 15 weight percent water soluble ferric salt is prepared on site and automatically such solution is charged to the first treating zone from a ferric solution reservoir at a rate sufficient to achieve a pH in the desired indicated range in the resulting aqueous mixture. The charging and the mixing rates are preferably chosen so as to achieve substantially immediately a change in the pH of the waste water composition to a desired value in the range indicated because, for one thing, any need for a finite holdup period in the first mixing zone while the pH of the starting waste water is gradually reduced to a value in the range of 3 to 5 is thereby eliminated. In general, for purposes of the present invention, it is not necessary following addition of ferric salt solution to a starting waste water composition in a first treating zone, to have a time lag once the pH has been changed to the desired range of 3 to 5 before the next step in the process is undertaken. First treating zones of fixed, constant volume are preferred, and a first treating zone is preferably in the form of a chamber.

A resulting mixture of starting waste water composition to which dissolved inorganic aqueous ferric salt solution has been added is deliberately overflowed from an upper region of the first mixing zone into a second mixing zone by gravity, thereby eliminating any need for any pump (mechanical transfer means), or the like. Like the first treating zone, the second treating zone is preferably of fixed, constant volume, and a second treating zone is preferably in the form of a chamber.

In such second treating zone, there is mixed with such resulting mixture a sufficient quantity of calcium hydroxide to make the pH of so-produced mixture in the second treating zone, fall in the range from about 7 to 8.

Typically and preferably, the calcium hydroxide employed is in a particulate form at the time of charging to such second treating zone; the partical size of the calcium hydroxide initially charged to such second treating zone falls in the range from about 50 to 100 microns, but larger and smaller particle sizes can be used.

Such a calcium hydroxide is preferably added in a solid or aqueous slurry form, and any convenient technique may be used for addition of calcium hydroxide to a second treating zone. Presently it is most preferred to add the calcium hydroxide in a solid particulate form for processing convenience, and for ease in automated equipment operation. However, if one prepares an aqueous slurry of calcium hydroxide, conveniently the amount of calcium hydroxide in such slurry on a 100 weight percent basis ranges from about 5 to 25 weight percent, and preferably from about 10 to 15 weight percent. On a 100 weight percent total $Ca(OH)_2$ system basis, owing to the relatively slight solubility of calcium hydroxide in water, one does not usually employ merely calcium hydroxide solutions as such in the practice of the process of the present invention.

As in the case of ferric ion addition to the first treating zone, the calcium hydroxide is preferably added to the second treating zone at a rate which is sufficient to achieve a substantially instantaneous change in mixture pH in the second treating zone to a desired value in the range from about 7 to 8, as above indicated for purposes of the present invention. No waiting period or time lag appears to be necessary for purposes of the present invention after a mixture in the second chamber has been treated with calcium hydroxide in a second treating zone as taught herein.

A so-produced mixture in such second treating zone to which $Ca(OH)_2$ has been added is deliberately overflowed from an upper region of the second treating zone into a third treating zone by gravity, thereby avoiding the need for any pump, mechanical transfer means, or the like. Like the first and second treating zones, the third treating zone is preferably of fixed constant volume, and a third treating zone is preferably in the form of a chamber.

In such a third treating zone, agitation action is substantially completely eliminated, or at least minimized. The level of the so-produced aqueous mixture in such third treating zone is permitted to rise and fall dependent in part upon the rate at which a starting waste water composition is charged to a first treating zone of this invention. By the use of such third treating zone, equalization of differential starting waste water composition input and output rates is thus achieved so that a starting waste water composition (which has been chemically treated in accord with the practice of this invention) can be and is, in accordance with the teachings of the practice of the present invention, generally uniformly withdrawable from such third treating zone for further processing (filtration) as hereinafter described.

However, in addition to functioning as a species of surge tank for incoming starting waste water compositions, the third treating zone also functions as a settling basin or tank so that particles, coagulants, and agglomerates in a given chemically treated waste water mixture in the third treating zone are permitted to settle downwardly towards the bottom regions of the third treating zone by gravity when such have a specific gravity greater than 1. Characteristically, by the practice of this invention, solids in the third treating chamber do have a specific gravity greater than 1.

An aqueous mixture in a third treating zone, as indicated, is generally removed therefrom at a relatively constant rate, and preferably continuously passed over cylindrical outer surface portions of the horizontally rotating drum of a vacuum filter assembly. The cylindrical outer surface portions of such horizontally rotating drum are coated with a layer of filter aid which is a substantially completely water insoluble, inert particulate material having a particle size below about 250 microns. Simultaneously, aqueous portions of the aqueous mixture in contact with such surface portions are drawn through such surface portions with the aid of subatmospheric pressures being maintained inside such drum. Also, simultaneously, there is continuously removed along a longitudinal portion of such rotating drum, the filter cake deposited on the outer surface portions thereof.

Figure 3:
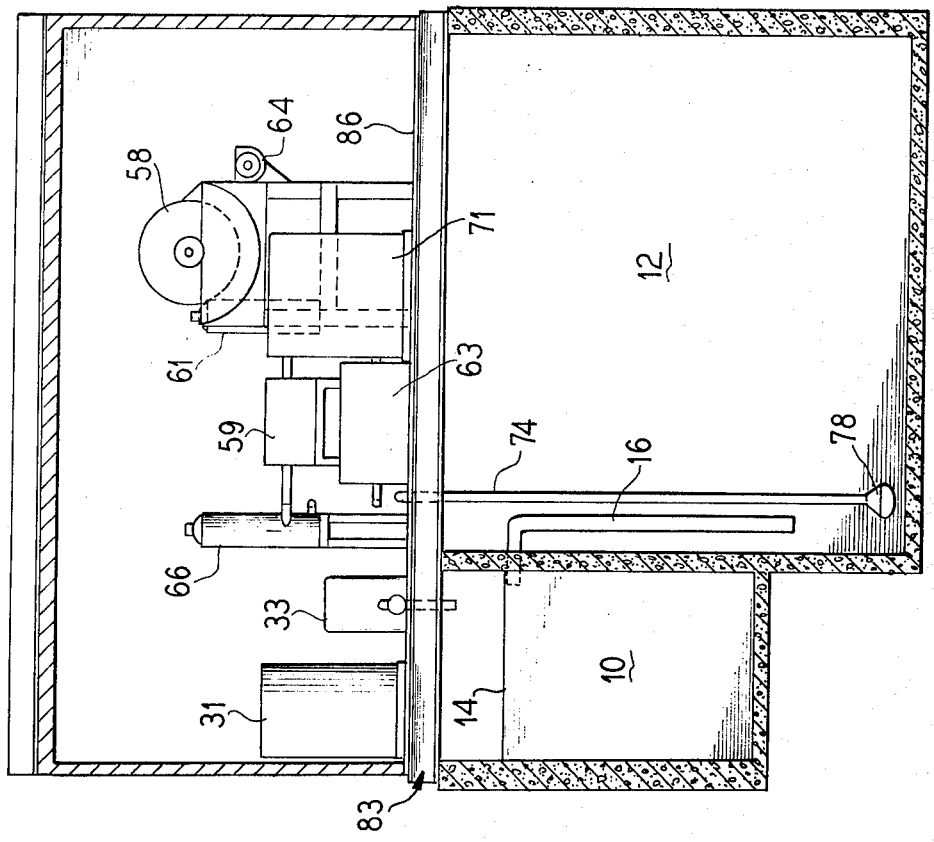
FIG. 3 is a side elevational view of the apparatus shown in FIG. 3.
Figure 2:
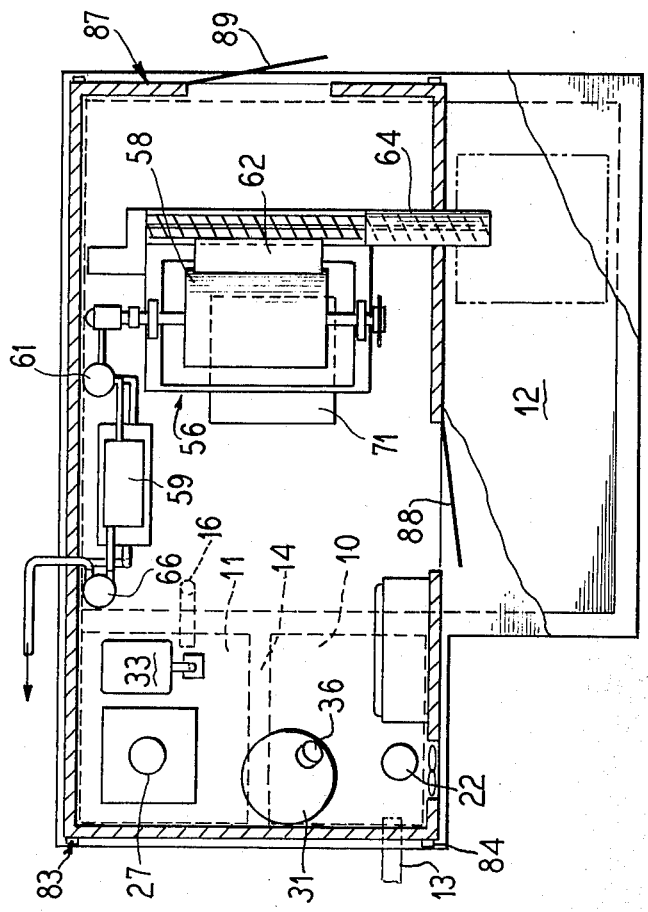
FIG. 2 illustrates a plan view of one preferred embodiment of apparatus adapted for the practice of the process of FIG. 2.

In another aspect, the present invention is directed to an apparatus for treatment of waste waters. Such apparatus is particularly useful for the practice of the process of the herein described invention and such apparatus is illustrated by FIGS. 1 through 3. Thus, referring FIG. 2, there is seen three chambers 10, 11 and 12 which are in generally horizontal, adjacent relationship to one another. The second chamber 11, has a liquid holding volumetric holding capacity of from about ½ to 2 times that of the first chamber 10, and the third chamber 12 has a liquid holding volumetric capacity of from about 10 to 100 times that of the first chamber 10. The first chamber 10 has an input port 13 defined therein.

The chambers 10, 11 and 12 can be of any convenient construction, but conveniently preferably are formed of concrete, as those skilled in the art will appreciate. The chambers 10 and 11 can be adapted or derived from a conventional grease pit of the type used in a meat or food processing plant or the like while chamber 12 represents an additional cavity provided for the practice of the present invention. Any suitable convenient constructional arrangement can be employed.

The chambers 10, 11 and 12 are interconnected by some form of interconnection means defining a passageway between upper end portions of, respectively, the first chamber 10 and the second chamber 11, and defining a passageway between the upper end regions of the second chamber 11 and the third chamber 12. The interconnection means is adapted to permit a liquid to overflow by gravity from the first chamber 10 into the second chamber 11, and then from the second chamber 11 into the third chamber 12. In the embodiment, liquid is permitted to overflow from chamber 10 across the top of partition 14 into chamber 11 and a tube 16 mountained transversely through partition 17 permits overflow to occur from the chamber 11 into the chamber 12, the tube 16 being generally aligned to be not above the top of partition 14 so that substantially no overflow occurs from the chamber 11 back into the chamber 10 as those skilled in the art will appreciate.

An agitator assembly 18 is provided in the first chamber 10, including an agitator 19, a shaft 21 and a powerhead 22, which can be an electric motor and a transmission combination, as those skilled in the art will appreciate. Similarly, an agitator assembly 23 is provided in chamber 11, including an agitator 24, a shaft 26 and a powerhead 27 which may be constructed in the manner of powerhead 22 for convenience.

Chamber 10 is equipped with a first pH sensor 28 which is adapted to generate a first instantaneous pH signal and which can be electrical, pneumatic, or the like, as those skilled in the art will appreciate. Such pH signal is caused to be representative of the actual pH sensed by first pH sensor 28 in first chamber 10. Similarly, a second pH sensor 29 is provided in second chamber 11 which is adapted to generate a second instantaneous pH signal representative of the actual pH sensed by such second pH sensor 29 in second chamber 11. Conventional pH sensors may be employed.

A first reservoir 31 is provided which is equipped with a first pipe 32 which functionally interconnects the first reservoir 31 with the interior of the first chamber 10. Also, a second reservoir means 33 is provided which is functionally interconnected with the interior of second chamber 11 by means of a second pipe 34. The reservoirs 31 and 33 can be of any conventional sort adapted for holding and for charging a particulate solid, an aqueous slurry or suspension, or an aqueous solution to their respective chambers 10 and 11. For example, in the embodiment shown, the first reservoir 31 comprises a tank whose size can range widely though a particularly convenient size fall within the range of 50 to 500 gallons. Into the reservoir 31 is introduced manually (or automatically, by means not detailed herein) a particular iron salt and also water, and the iron salt is dissolved in the water to prepare a desired solution of ferric salt whose concentration characteristics are as above described. In the apparatus shown, the first reservoir 31 is thus conveniently provided with an agitator assembly 36 whose structure is similar to that of agitator means 33. Any convenient agitator structure may be employed for the first reservoir 31.

Also, for example, in the embodiment shown, the second reservoir means 33 comprises a conventional type dry lime feeder.

Alternatively, the second reservoir can be a tank (not shown) wherein a slurry of calcium hydroxide is prepared.

A first variable valve 46 is provided in first pipe means 32 and a second variable valve 47 is provided in the second pipe means 34. Conventional variable valves may be employed, the choice depending upon such factors as the type of reservoirs 31 and 33 being employed, the nature of the ferric salt composition and the calcium hydroxide composition, respectively, being added, and the like. The word "valve" is being used herein in a generic sense to include all orifice varying mechanisms where the fluid flowing through the orifice is liquid, slurry, or particulate solid (with or without a carrier medium).

Each of the conventional variable valves 46 and 47 is adapted to control the flow of material from the respective reservoirs 31 and 33. Valve 46 is equipped with a first regulator 48, and valve 47 is equipped with a second regulator 49. Each regulator 48 and 49 is conventional and is so functionally associated with its respective valve 46 and 47 that each regulator 48 and 49, respectively, is adapted to move its respective associated valve 46 and 47 between substantially open and substantially closed positions in response to an input signal fed thereto. Each such regulator 48 and 49, respectively, can be electrically operated, pneumatically operated, or the like, as desired, as those skilled in the art will appreciate. Valve regulator means are well known to the art and do not constitute as such a point of novelty in the present invention. For example, the regulator 49 can comprise a motor and a speed controller, the latter being responsive to signal inputs from controller 52, the former being driven by such speed controller (components not detailed). Such motor drives valve means 47 which can here be regarded as a conventional four chambered rotary feeder.

Functionally interconnecting the first pH sensor 28 with the first regulator means 48 is a first controller 51. First controller 51 is adapted to receive and compare the first instantaneous pH signals generated by the first pH sensor 28 with a first preset signal generated by the first controller 51. The first preset signal generated by the first controller 51 is representative of a predetermined pH value desired to be achieved and maintained in an aqueous phase existing in the first chamber 10 during operation of the apparatus of this invention. The first controller 51 is further adapted to generate a first output signal which is representative of any difference between the first instantaneous pH signal generated by the first pH sensor 28 and such first preset signal. Furthermore, the first controller 51 is adapted to feed such first output signal to the first regulator means 48. Thus, passage of material from the first reservoir 31 into the first chamber 10 is controlled by the pH in the first chamber 10 during operation of the apparatus.

Similarly, the second controller 52 functionally interconnects the second pH sensor 29 with the second regulator means 49. The second controller 52 is adapted to receive and compare the second instantaneous pH signals developed by the second pH sensor 29 with a second preset signal generated by the second controller 52. The second preset signal generated by the controller 52 is representative of a predetermined pH value to be achieved in an aqueous phase in the second chamber 11 during operation of the apparatus. The second controller 52 is further adapted to generate a second output signal representative of any difference between the second instantaneous pH signal generated by the second pH sensor 29 and the second preset signal generated by the second controller 52. The second controller 52 is further adapted to feed such second output signal to the second regulator means of 49. Thus, passage of material from the second reservoir means 33 into the second chamber 11 is controlled by the pH in the second chamber 11 during operation of the apparatus.

The apparatus further incorporates a rotary vacuum filter assembly 56. Rotary vacuum filter assemblies as such are well known to the prior art and do not as such constitute a part of the present invention; such filters are described, for example, in the Fifth Edition of "Chemical Engineer's Handbook" by Perry and Chilton, McGraw-Hill Book Company, 1973, at pages 19–76 through 19–78.

The rotary vacuum filter assembly 56 employed in the apparatus embodiment presently under consideration includes a tank member 57 and a drum member 58. The drum member 58 is adapted for rotation in the tank member 59 and is further adapted to have a layer of finally divided material, sometimes called a filter aid, deposited on circumferential surface portions thereof. In order to vacuumize interior portions of circumferential regions of the drum member 58, a vacuum pump 59 is provided which is interconnected by appropriate tubing (not detailed in the drawings) with the interior of the drum member 58 via a gas/liquid separator 61. Assembly 56 is further provided with a blade means 62 (not detailed herein) which longitudinally extends exteriorly along the circumferential surface portions of the drum member 58. The blade means 62 is adapted to excise continuously an increment of the layer of filter aid material deposited upon circumferential surface portions of the drum member 58 as the drum member 58 rotates. A liquid filtered into the interior of the drum member 58 during operation of assembly 56 is evacuated axially from one end of the drum member 58 typically into the gas/liquid separator 61 from which the liquid is removed by any convenient means such as by pump 63. From pump 63, the filtered liquid can be sewered. The rotary vacuum filter assembly 56 is adapted for continuous filtration of a chemically treated waste water composition, in accordance with the teachings of the present invention, which is deposited in the tank member 57 and which is filtered into the interior of the drum member 58 through circumferential surface portions thereof during operation of the filter assembly 56. The rate of filtration of the filter assembly 56 is preferably known and prechosen, the choice of a given filtration rate in any given instance being dependent upon the type of apparatus involved and upon the rate at which waste water is to be charged to the apparatus. Filter cake removed by blade means 62 from drum member 58 during operation of assembly 56 may be conveniently removed from the assembly 56 by any convenient means, one convenient means being presently illustrated as a screw conveyor 64. The filter assembly 56 may be provided with added features, if desired. For example, an auxiliary gas/liquid separator 66 is preferably employed to separate any water carried over into the vacuum pump 59 and passed therethrough. Liquid collected in the separator 66 is discharged into a sewer or the like through a line 67.

In accordance with the teachings of this invention, the chemically treated liquid in the third chamber 12 is moved from the chamber 12 into tank 57 of filter assembly 56. However, before such a transfer is undertaken, the filter aid for the assembly 56 is prepared and positioned on the circumferential surface portions of the drum member 58. In general, the filter aid is an inert, particulate, substantially completely water insoluble material having a particle size below about 250 microns. A particularly convenient such material is an aluminum calcium silicate, such as Fuller's earth, bentonite, diatomaceous earth, amocite, asbestos, pulp paper, synthetic or natural fibers, or the like. Conveniently, the filter aid is prepared as a slurry of from about 2.5 to 25 weight percent (total slurry weight) of such particulate material in water. The filter aid is conveniently prepared in a tank 71 following which it is discharged through a line 72 with pump 73 into the tank 57 of the assembly 56 with the drum member rotating and vacuumized in the conventional way, as those skilled in the art will appreciate.

Thus, as the filter aid slurry is discharged into the tank 57 from the tank 71, the drum member 58 is vacuumized by the vacuum pump 59. Preferably, a cloth-like screen member (not shown) is interposed over and about circumferential surface portions of the drum member 58 before the filter aid is introduced into the tank member 59. Typical subatmospheric pressures maintained on the exterior surfaces from the drum interiorly, the drum member 58 at this time range from about 4 to 12 PSIA, and typical drum rpm values range from about 1.0 to 10.0, through higher and lower pressures, and rpm's respectively, may be employed in the practice of this invention as those skilled in the art will appreciate.

The filter aid is deposited as a layer upon the circumferential or cylindrical working surfaces of the drum member 58 and is held to such surfaces by the subatmospheric pressures employed. Typical starting thicknesses of the layer of filter aid composition upon cylindrical surface portions of the drum member 58 range from about ½ to 6 inches, and preferably from about 2 to 3 inches, and the amount of filter aid slurry added is chosen so as to be sufficient to produce a layer of this thickness. After the filter aid has thus been deposited upon cylindrical surface portions of the drum 58, and the pump 73 in line 72 has been cut off, the chemically treated waste liquid in the treatment tank 12 is passed into the tank member 57 through line 74 past a valve 76 therein which is in an open position, and with a pump 77 associated with line 74 operating. The mouth of line 74 in a lower region of chamber 12 is provided in the embodiment shown with an enlarged intake member 78 which is filled with a screen to prevent plugging of line 74 during operation of the apparatus.

Using the above indicated pressures and drum rpm's, the chemically treated waste liquid undergoes filtration to separate waste solids from waste liquids. The liquid or aqueous effluent is drawn off and collected, as indicated, in the gas/liquid separator or receiver 61 and the solids are collected as a deposit upon the cylindrical surface portions of the drum member 58, as indicated, from which they are removed as a filter cake, and transported away by the screw conveyor 64 or the like with the aid of the blade means 62. It is preferred to use a blade means 62 which is adapted to cut away a surface portion of the layer of filter aid material upon the drum member 58 rather than merely scraping or rubbing such away. Thus, it is preferred to use a blade means 62 which systematically and continuously removes by cutting action, a filter cake and a small portion of the filter aid particulate material as a layer which ranges in thickness from about 0.001 to 0.010 inches in thickness measured radially relatively to the axis of the drum, though thinner and thicker layers may be taken off, if desired. Such an arrangement is particularly satisfying for present purposes, since the solid material deposited upon cylindrical drum portions of drum member 58 is typically and characteristically in a somewhat slimy form which makes separation and removal thereof difficult without the use of the combination of a filter aid layer so deposited upon drum 58 and so removed therefrom by blade means 62 as indicated.

The solids so removed from the drum 58 are found characteristically to be in a nearly dry condition, and such may be used directly for sanitary land fill purposes. These solids are characteristically relatively insoluble in water and show a very low tendency to leech. Preferably, the chemically treated waste water in chamber 12 is continuously fed to the rotary vacuum filter assembly 56 at a rate which is not greater than the filtration rate associated with the filter assembly 56, or the rate at which such assembly 56 operates. Transfer of liquid preferably at a continuous transfer rate from the chamber 12 to the tank 57 is continued until all of a given batch of the filter aid on a cylindrical surface portion of the drum member 58 has been substantially consumed after which the pump 77 is cut off and the valve 76 is closed.

At the end of such a processing period, the drum member 58 is flushed preferably with clear water provided through a line 81 into the tank member 57 to remove any filter aid material remaining on cylindrical surface portions of the drum member 58, and this effluent is conveniently returned or discharged into the chamber 12 or into the chamber 11 (by lines not shown in FIG. 2). When not in use, line 81 is closed by valve 82. Thereafter, the cylindrical surface portions of the drum member 58 are recoated with filter aid material from the tank 71 in the manner earlier described, after which the filtration of liquid transferred from a tank or chamber 12 into the tank member 57 of filter assembly 56, is continued in the manner earlier described. Those skilled in the art will appreciate that, when the rotary vacuum filter assembly 56 is removed from operation for servicing or for replacement of its filter aid layer, the liquid level within the third chamber 12 is allowed to rise. In this way, no interference with the charging of starting waste waters into the apparatus of this invention via input line 13 occurs, which is one of the outstanding advantages of the apparatus of this invention.

The interrelationship between the respective volumetric capacities of the chambers 10, 11 and 12 and the transfer rate of fluid from chamber 12 into tank member 57 is such that, during normal predetermined operation of the apparatus, this invention, the lower region of chamber 12 is continuously filled with a liquid, and liquid from such bottom or lower region of chamber 12 may be continuously withdrawn for transfer to the rotary vacuum filter assembly 56 when such assembly is duly provided with filter aid material on its drum member 58. Preferably, the volume of liquid accumulated in chamber 12 never exceeds the volumetric capacity of chamber 12 during predetermined normal operation of the apparatus.

Any thickened or settled material in chamber 12 which tends to collect in the lower regions thereof is withdrawn into line 74 for transfer into the tank member 57. Upper regions of liquid in chamber 12 tend to be clarified relative to lower regions thereof.

In a preferred form, the apparatus of this invention has defined in an upper end region of third chamber 12, an output port 79 which is adapted for emergency use as an overflow conduit in the event of overfilling overflowage of the third chamber 12 for any reason. It is one of the distinct advantages of the present invention that effluent from the port 79 meets all (presently) known minimum federal, state and local governmental standards for water sewering.

A basic advantage of the present invention is the fact that overflow of the third chamber 12 meets minimum governmental standards for discharge to minicipal sewer systems. Such an overflow quality is achieved by using a third chamber 12 as described in combination with the other apparatus elements of this invention. Once starting waste waters are chemically treated as described herein, solids in such treated water show marked tendency to settle rapidly to the bottom of any given chamber holding such treated water. The size of the third chamber 12 is chosen preferably so as to have cross-sectional areas such that the settling velocity of solid particles or flocculant in such treated water is greater than the rise of liquid to the surface. One preferred cross-sectional configuration for purposes of practicing in a preferred manner the present invention, is to use a third chamber 11 wherein the sides of the third chamber 11 are perpendicular generally and the ratio of chamber cross-sectional area to chamber height (to overflow 79) falls in the range from about to but other chamber configurations can be employed. Preferably, a third chamber 12 operates or functions separate and collects solids in the bottom portions of the chamber where they may accumulate during periods when the filter is not in operation, and result in a clearing of the liquid accumulating in chamber 12 as such rises to overflow 79 of the chamber 12. This phenomenon is used commercially in the prior artt in devices called "clarifiers." However, in the practice of the present invention, the "clarifier" function is used only as an emergency treatment in the event that the filter 56 is not in operation or is not able to filter at a rate consonant with the input rate of waste water composition into first chamber 10. The combination of the chamber 12 and the filter 56 therefore produces an effluent of much higher quality (i.e. 10 parts per million suspended solids) than could normally be achieved by the use of a "clarifier" alone. In addition, the apparatus of this invention eliminates the mechanisms involved in a clarifier operation, these mechanisms commonly being drag conveyors, pumps and associated equipment, and the like. As a minimum, therefore, one can, by the system of the present invention, produce an effluent of generally equal quality to that which could be achieved by a well-designed clarifier device, however; during normal operation of a system of this invention, one typically produces an effluent that is far superior to that which can be achieved by a clarifier device.

The third chamber 12 is preferably sized to hold the total average effluent which a food processing plant will generate over a period of from about 4 to 8 hours. The solids accumulation portion of such a chamber, however, is sufficiently large to permit the system to be preferably operated without the filter 56 or equivalent for periods of 24 to 48 hours before overflow of the treated solids will occur from chamber 12. As can be readily seen from the preceding description, the combination of a simple settling chamber 12 with a vacuum filter 56 produces a better effluent than can be achieved through more complicated clarifiers at a characteristically far lower cost for installation and operation from a user standpoint.

In a preferred form of the present invention, the first chamber 10 and the second chamber 11 have approximately equal liquid holding volumetric capacities. Also, in a preferred form of practicing the present invention, the rate of removal of fluid from the third chamber 12 is such that, over a 24 hour day, the fluid level in the chamber 12 is maintained at about from ½ to ⅓ the depth of such chamber 12.

As shown in FIGS. 1–3, apparatus of this invention is preferably constructed so as to be supported by a frame assembly 83 which includes a pair of spaced, parallel beams 84 and 85 that are adapted for extension over the chambers 10, 11 and 12 and for support of various elements of the apparatus generally over the chambers 10, 11 and 12. Conveniently, a plate 86 extends transversely across beams 84 and 85 and is secured thereto by bolts, welding, rivets, etc. depending upon the particular construction materials chosen for an individual apparatus of this invention including steel, reinforced glass fiber filled polyester, etc.. Preferably, an apparatus is so constructed that substantially all of the components thereof except for the chambers 10, 11 and 12 are secured to, suspended from, or the like, such frame assembly 83, so that such apparatus can be not only pre-fabricated at a factory site remote from the installation site, but also miniaturized and, if desired, automated.

Thus, such a subassembly supported by frame assembly 83 can hold and comprise the rotary vacuum filter assembly 56, the reservoirs 31 and 33, the agitator assemblies, 18 and 23 (or portions thereof), the pH sensors 28 and 29 (or portions thereof), the variable valve means 46 and 47, the regulators 48 and 49, the controllers 51 and 52, the tube transfer means (including line 74, pump 77 and valve 76), or portions thereof, and auxiliary members, as those skilled in the art will appreciate. Further, such a subassembly is further so fabricated that a shed or small house 87 (itself prefabricated) can be mounted over and about such so as to make same enclosable on location, yet available for maintenance, as through doors 88 and 89, or the like.

EMBODIMENTS

The present invention is further illustrated by reference to the following Examples. Those skilled in the art will appreciate that other and further embodiments are obvious and within the spirit and scope of this invention from the teachings of these present Examples taken with the accompanying specification and drawings.

EXAMPLE 1

Using an embodiment of the present invention as shown in FIGS. 1 through 3 as hereinabove described, a waste water from a meat processing plant is continuously charged as generated to a first chamber 10. Over a 24 hour day, the instantaneous flow rate varies from 0 to about 100 gallons per minute, with the 24 hour day average rate being about 20 gallons per minute. In composition, this waste water contains from about 100 to 4000 parts per million total of hexane soluble material, and about 8000 parts per million of suspended solids which are below about 200 millimicrons in average diameter. This waste water contains about 5 weight percent toal non-aqueous matter of which about 3 weight percent thereof comprises mixed tri-glycerides of animal origin with the balance up to 100 weight percent thereof being water. This waste water has an initial pH of about 6 to 12. Agitator 19 is continuously operated after waste water is charged to such first chamber 10.

The pH sensor 28 in the first chamber 10 continuously monitors the pH of the aqueous mixture in such chamber 10 and an aqueous solution of 10 weight percent ferric sulfate is metered into such chamber 10 from first reservoir 31 via valve 46 at a rate sufficient to maintain the pH of such aqueous mixture in such first chamber 10 in the range from about 3 to 5.

After the liquid level in first chamber 10 rises to the top of partition wall 14, the aqueous mixture in first chamber 10 overflows into second chamber 11. The pH 29 in the second chamber 11 continuously monitors the pH of the aqueous mixture in such second chamber 11, and calcium hydroxide in the form of commercial grade powder is discharged into such second chamber 11 from second reservoir 33 via valve 47 at a rate sufficient to maintain the pH of such aqueous mixture in such second chamber 11 in the range from about 7 to 8. Agitator 24 is continuously operated after waste water is charged to such second chamber 11.

After the liquid level in second chamber 11 rises to the mouth of conduit 16, the aqueous mixture in second chamber 11 overflows into third chamber 12. This mixture is allowed to empty into third chamber 12 from conduit 16 permitting the level of liquid in such third chamber 12 to rise and fall.

The liquid in third chamber 12 is pumped by pump 77 through line 74 into the tank 57 of the rotary vacuum filter assembly 56 at a rate of about 20 gallons per minute and is filtered through the circumferential surface portions of drum 58 thereof. The filtered water is found to be substantially water-white in color and to contain not more than about 40 parts per million of hexane solubles and not more than about 10 parts per million of colloidal suspended solids. The pH is 7–8. Thus this product water meets all state and federal standards for water sewering.

The solids removed from the cylindrical surface of drum 58 are found to be in a semi-dry form which are readily extrudable through screw conveyor 64. This filtered material is found to be substantially water insoluble and is suitable for immediate, direct use as sanitary landfill.

Before operation of the rotary vacuum filter assembly 56 is commenced, the drum 58 is coated on its circumferential surface portion with filter aid (diatomaceous earth having an average particle size of about 50 microns) using an aqueous slurry from slurry tank 71 using the procedure earlier described herein. The system is continuously operated until the layer of filter aid material on the drum has been almost completely consumed (cut away by blade 62) by normal operation of assembly 62, at which point pumping of liquid from third chamber 12 is stopped, but operation of first chamber 10, second chamber 11, and third chamber 12 is continued (in other words, waste waters continue to be charged to first chamber 10 for chemical treatment in first chamber 10 and in second chamber 11, and the liquid level in third tank 12 is allowed to rise.).

EXAMPLE 2

Before the liquid level rises in third chamber 12 to overflow outlet 79, and after filtration operation of assembly 56 has ceased, a fresh layer of the filter aid material is applied to the cylindrical surface portions of drum 58 by the sequence of steps hereinabove described. Then, pump 77 is started and liquid from third chamber 12 is again charged to tank 57 and filtered through drum 58 in normal operating filtration sequence.

The filtered water and the solids produced are found to be substantially identical to those, respectively produced in Example 1.

By this sequence, the liquid level in the third chamber 12 is found to be continuously maintainable below the level of the overflow outlet 79, so that waste waters can be charged indefinitely to first chamber 10 without overflow during normal operating conditions.

EXAMPLE 3

As a test procedure, at the end of the operational sequence described in Example 1, the rotary vacuum filter assembly 56 is recharged with the filter aid, but is not placed back in filtration service, so that the fluid level in such third chamber 12 is caused to rise up to the overflow part 79, and to drain therefrom. The aqueous liquid so draining is sampled and found to analyze approximately as follows, on the average:

a. Color: Yellowish
b. Hexane solubles: 100 parts per million
c. Colloidal suspended solids: 50 parts per million
d. pH: 7–8

These qualities show that this water satisfies minimum standards of MSD of G. C. (for example) for sewering water.

EXAMPLE 4

The procedure of Example 1 is generally repeated except that the waste water used as a starting material is a waste water derived from a plant producing portionalized food product (i.e. frozen individual dinners commonly called "TV dinners"). This waste water happens to be characterized similarly to the waste water involved as a starting material in Example 1. The product effluent is similar to that achieved in Example 1.

The claims are:

1. An apparatus for treating waste water comprising
   A. three chambers in generally horizontally adjacent relationship to one another, a second said chamber having a liquid holding volumetric capacity of from about ½ to 2 times that of a first of said chambers, and a third of said chambers having a liquid holding volumetric capacity of from about 10 to 100 times that of said first chamber, said first chamber having an input port therein,
   B. interconnection means defining a passageway between upper end regions of said first and said second chambers, and a passageway between upper end regions of said second and said third chambers, said interconnection means being adapted to permit a liquid to overflow by gravity from said first into said second chamber, and from said second chamber into said third chamber,
   C. a first and a second agitator means in each of said first and said second chambers respectively, each respective said agitation means including an agitator and a powerhead adapted for operating each said agitator thereof,
   D. a first pH sensor in said first chamber adapted to generate first instantaneous pH signals representative of the actual pH sensed by said first pH sensor, and a second pH sensor in said second chamber adapted to generate second instantaneous pH signals representative of the actual pH sensed by said second pH sensor,
   E. first and second reservoir means, including first pipe means functionally interconnecting said first reservoir means with said first chamber, and second pipe means functionally interconnecting said second reservoir means with said second chamber,
   F. first variable valve means in said first pipe means and second variable valve means in said second pipe means,
   G. first regulator means functionally associated with said first valve means, and second regulator means functionally associated with said second valve means, each regulator means being adapted to move its respective associated valve means between substantially open and substantially closed positions in response to an input signal fed thereto,
   H. first controller means functionally interconnecting said first pH sensor with said first regulator means, said first controller means being adapted to receive and compare said first instantaneous pH signal with a first preset signal generated by said first controller means, said first preset signal being representative of a predetermined pH valve to be achieved in an aqueous phase in said first chamber during operation of said apparatus, said first controller means being further adapted to generate a first output signal representative of any difference between said first instantaneous pH signal and said first preset signal and to feed said first output signal to said first regulator means whereby passage of material from said first reservoir means into said first chamber is controlled by the pH in said first chamber during operation of said apparatus,
   I. second controller means functionally interconnecting said second pH sensor with said second regulator means, said second controller means being adapted to receive and compare said second instantaneous pH signal with a second preset signal generated by said second controller means, said second preset signal being representative of a predetermined pH valve to be achieved in an aqueous phase in said second chamber during operation of said apparatus, said second controller means being further adapted to generate a second output signal representative of any difference between said second instantaneous pH signal and said second preset signal and to feed said second output signal to said second regulator means whereby passage of material from said second reservoir means into said second chamber is controlled by the pH said second chamber during operation of said apparatus,
   J. a rotary vacuum filter assembly including a tank member, a drum member whose lower portions are adapted for horizontal rotation in said tank member and which drum member is further adapted to have a layer of finely divided filter aid material on circumferential surface portions thereof, vacuumization means for maintaining said circumferential surface portions interiorly at subatmospheric pressures, blade means longitudinally extending exteriorly along said circumferential surface portions and adapted to excise continuously an increment of said layer as said drum member rotates, a separation means to remove a liquid filtered into said drum through said so vacuumized circumferential surface portions as said drum member rotates, said rotary vacuum filter assembly being adapted for continuous filtration at some predetermined rate for liquid in said tank member as said drum member rotates, and
   K. tube transfer means, including a pump means, adapted to transfer continuously a liquid from a lower region in said third chamber to said tank member at a rate which is not greater than said filtration rate,
   L. the interrelationship between the respective said volumetric capacities and said transfer rate being such that, during normal predetermined operation of said apparatus, said lower region is continuously filled with a liquid yet the quantity of such liquid in said third chamber never exceeds said volumetric capacity thereof.

2. The apparatus of claim 1 wherein said three chambers are spatially located in respective positions which are lower than the respective positions of said reservoir means and said rotary vacuum filter assembly, and said tube transfer means includes pump means.

3. The apparatus of claim 1 wherein said third chamber has defined in an upper end region thereof an output port which is adapted for emergency use in the event of overfillage of said third chamber.

4. The apparatus of claim 1 wherein said first and said second chambers have approximately equal liquid holding volumetric capacity.

5. A process for cleanup of fat containing waste water comprising the steps of

A. charging generally at an irregular rate of fat containing waste water composition to a first treating zone,
   said waste water composition being derived from cleanup of food preparation operations,
   said waste water composition containing from about 100 to 4,000 parts per million of hexane soluble material and from about 100 to 10,000 parts per million of suspended solids which are below about 250 millimicrons in average diameter
   said waste water composition having a pH in the range from about 5 through 14,
B. mixing with said waste water composition in said first treating zone a sufficient quantity of a dissolved inorganic aqueous ferric salt solution to make the pH of the resulting mixture fall in the range from about 3 to 5,
C. overflowing said resulting mixture from said first treating zone into a second treating zone by gravity,
D. mixing with said resulting mixture in said second treating zone a sufficient quantity of calcium hydroxide to make the pH of the so-produced mixture fall in the range from about 7 to 8,
E. overflowing said so-produced mixture into a third treating zone by gravity,
F. allowing the level of said so-produced mixture in said third treating to rise and fall while simultaneously permitting settling to occur therein,
G. removing the so settled said mixture at a generally constant rate from said third treating zone and continuously passing same over the cylindrical outer surface portions of a horizontally rotating drum of a vacuum filter assembly, said surface portions being coated with a layer of substantially completely water-insoluble, inert particulate material having a particle size below about 250 millimicrons in average diameter, while simultaneously continuously drawing aqueous portions of such mixture through said surface portions and simultaneously continuously removing longitudinally, from said surface portions, the filter cake deposited on said surface portions.

6. The process of claim 5 wherein said first treating zone has a volumetric capacity of from about 0.003 to 0.015 times the estimated average volume of said resulting mixture per 24 hour day.

7. The process of claim 5 wherein said second treating zone has a volume approximately that of said first treating zone.

8. The process of claim 5 wherein said second treating zone has a volume of from about ½ to 2 times that of said first treating zone.

9. The process of claim 5 wherein said third treating zone has a volume of from about 10 to 100 times that of said first treating zone.

10. The process of claim 5 wherein said removing is carried out in a gravitationally lower region of said third treating zone.

11. The process of claim 4 wherein said generally constant rate of removal from said third treating zone is such that the average level of said so-produced mixture in said third treating zone per 24 hour day is from about ½ to ⅔ the depth of said third treating zone.

12. The process of claim 4 wherein, in said third treating zone, said so-produced mixture is allowed to undergo settling to clarify upper portions of such mixture, and said third treating zone is provided with an overflow operative in an upper region thereof in the event that the level of said so-produced, so-clarified mixture in said third treating zone ever rises thereto thereby to provide an effluent from said overflow which meets discharge criteria.

13. The apparatus of claim 1 wherein
A. said rotary vacuum filter assembly further includes reservoir means adapted to hold a supply of filter and material, delievery means including first valve means adapted to deliver from said reservoir means into said tank member such filter aid material when said layer has been substantially completely so-excised, and
B. second valve in said tube transfer means adapted to cut off flow of liquid through said tube transfer means.

14. An apparatus for positioning over a grease pit area, said apparatus being adapted for treating wash water in combination with said grease pit, said grease pit area having three chambers in generally horizontally adjacent relationship to one another, a first said chamber having an input part therein, and having interconnection means to permit a liquid to overflow by gravity from said first chamber into a second chamber, and from said second chamber into a third chamber, said apparatus being in a containerized form and comprising:
A. frame means including a pair of spaced, generally parallel skid members at the base thereof,
B. a rotary vacuum filter assembly mounted in said frame means including a tank member, a drum member whose lower portions are adapted for horizontal rotation in said tank member and which drum member is further adapted to have a layer of finely divided filter and material on circumferential surface portions thereof, vacuumization means for maintaining said circumferential surface portions interiorly at subatmospheric pressures, blade means longitudinally extending exteriorly along said circumferential surface portions and adapted to excise continuously an increment of said layer as said drum member rotates, separation means to remove a liquid filtered into said drum through said so-vacuumized circumferential surface portions as said drum member rotates, said rotary vacuum filter assembly being adapted for continuous filtration at some predetermined rate for liquid in said tank member as said drum member rotates,
C. first and second reservoir means, each mounted in said frame means and including first pump means functionally adapted for interconnection with said first chamber and second pipe means functionally adapted for interconnection with said second chamber,
D. a first and a second agitator means mounted in said frame means adapted for each of said first first and said second chambers, respectively, each respective said agitator means including a powerhead from which extends downwardly a shaft means on which is secured an agitator,
E. a first pH sensor means for said first chamber adapted to generate rustantaneous pH signals representative of actual pH sensed by said first pH sensor means and a second pH sensor means in said second chamber adapted to generate second rustantaneous pH signals representative of actual pH sensed by said second pH sensor means, said first and said second pH sensor means each being mounted in said frame means,
F. first variable valve means in said first pipe means and second variable valve means in said second pipe means,
G. first regulator means functionally associated with said first valve means, and second regulator means functionally associated with said second valve means, each regulator means being adapted to move its respective associated valve means between substantially open and substantially closed positions in response to an input signal fed thereto,
H. first controller means functionally interconnecting said first pH sensor with said first regulator means, said first controller means being adapted to receive and compare said first instantaneous pH signal with a first preset signal generated by said first controller means, said first preset signal being representative of a predetermined pH valve to be achieved in an aqueous phase in said first chamber during operation of said apparatus, said first controller means being further adapted to generate a first output signal representative of any difference between said first instantaneous pH signal and said first preset signal and to feed said first output signal to said first regulator means whereby passage of material from said first reservoir means into said first chamber is controlled by the pH in said first chamber during operation of said apparatus, said first controller means being mounted in said frame means,
I. second controller means functionally interconnecting said second ph sensor with said second regulator means, said second controller means being adapted to receive and compare said secnd instantaneous pH signal with a second preset signal generated by said second controller means, said second preset signal being representative of a predetermined pH valve to be achieved in an aqueous phase in said second chamber during operation of said apparatus, said second controller means being further adapted to generate a second output signal representative of any difference between said second instantaneous pH signal and said second preset signal and to feed said second output signal to said second regulator means whereby passage of material from said second reservoir means into said second chamber is controlled by the pH said second chamber during operation of said apparatus, said first controller means being mounted in said frame means, and
J. tube transfer means, including a pump means, adapted to transfer continuously a liquid from a lower region in said third chamber to said tank member at a rate which is not greater than said filtration rate, said tube transfer means being mounted in said frame means.

* * * * *